No. 789,196. PATENTED MAY 9, 1905.
G. ZOLL.
COTTON CHOPPER AND CULTIVATOR.
APPLICATION FILED OCT. 17, 1904.

2 SHEETS—SHEET 1.

WITNESSES:

INVENTOR
George Zoll,
BY Milo B. Stevens & Co.
Attorneys.

No. 789,196. PATENTED MAY 9, 1905.
G. ZOLL.
COTTON CHOPPER AND CULTIVATOR.
APPLICATION FILED OCT. 17, 1904.
2 SHEETS—SHEET 2.
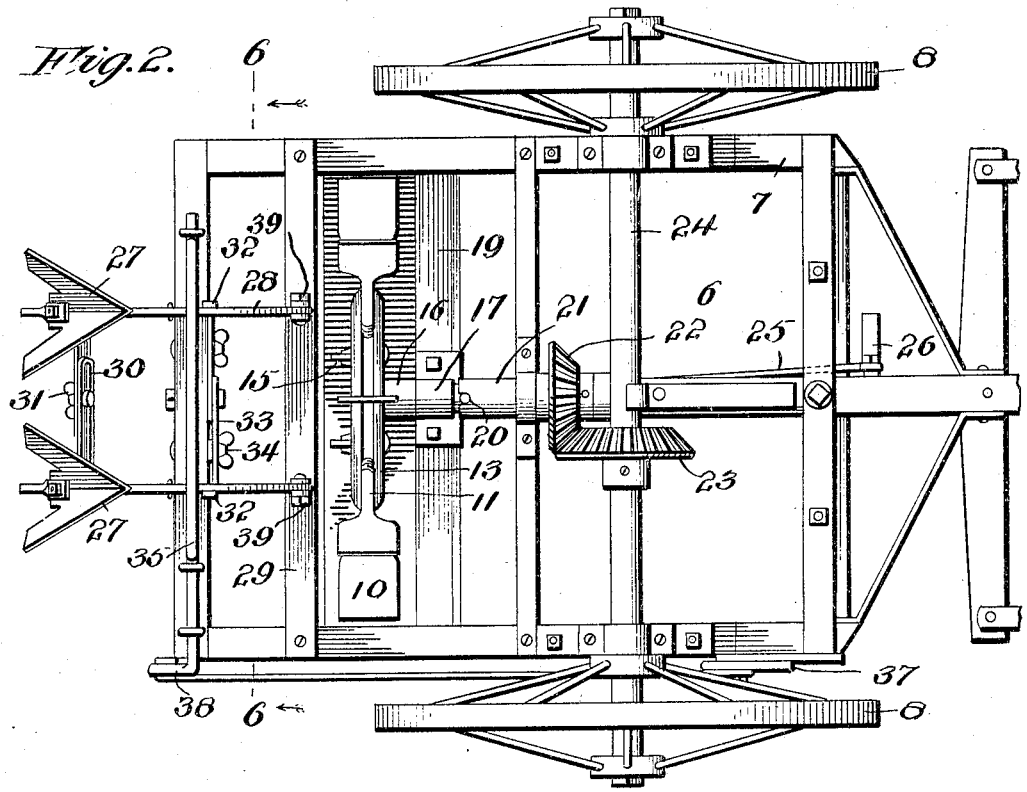
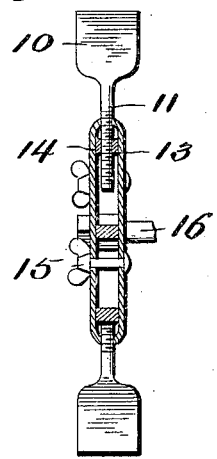
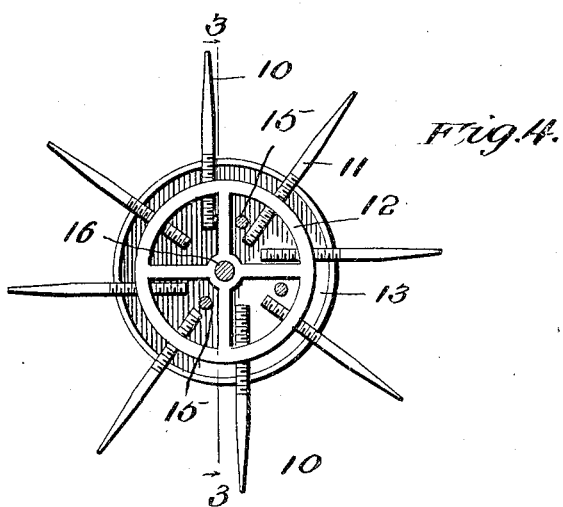
WITNESSES:
Wm. H. Doyle.
Geo. E. Few.
INVENTOR
George Zoll,
BY
Milo B. Stevens & Co.
Attorneys.

No. 789,196.

Patented May 9, 1905.

UNITED STATES PATENT OFFICE.

GEORGE ZOLL, OF FAYETTEVILLE, TEXAS.

COTTON CHOPPER AND CULTIVATOR.

SPECIFICATION forming part of Letters Patent No. 789,196, dated May 9, 1905.

Application filed October 17, 1904. Serial No. 228,858.

*To all whom it may concern:*

Be it known that I, GEORGE ZOLL, a citizen of the United States, residing at Fayetteville, in the county of Fayette and State of Texas, have invented new and useful Improvements in Cotton Choppers and Cultivators, of which the following is a specification.

This invention is an improved cotton chopper and cultivator, and is characterized by an improved general construction, and particularly by novel means for holding and adjusting the chopping-blades, as well as for raising and lowering the cultivator-shovels.

The invention is illustrated in the accompanying drawings, wherein—

Figure 1:
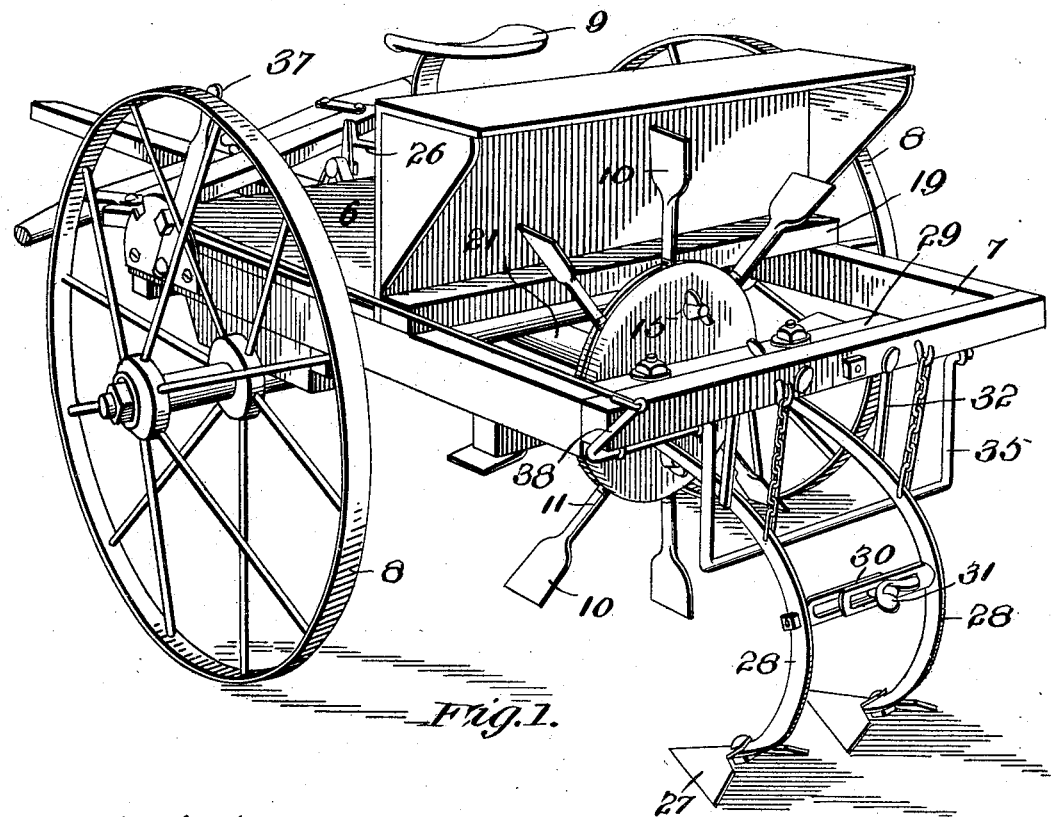
Figure 5:
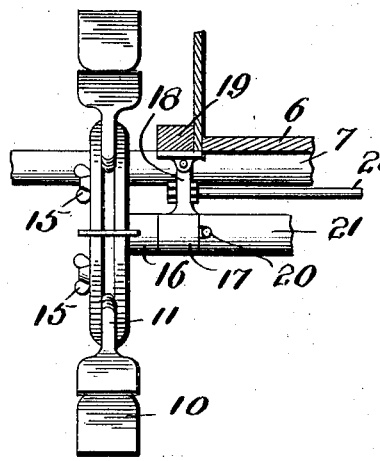
Figure 6:
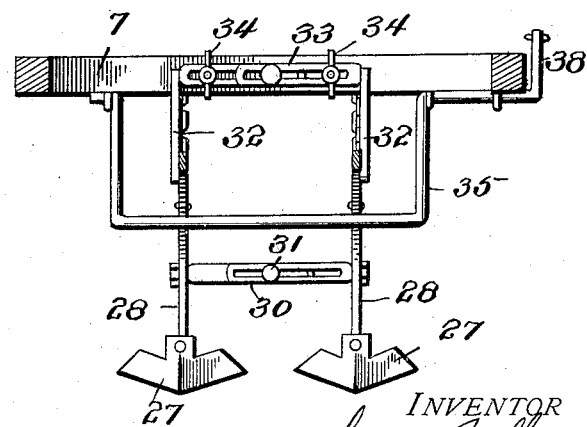

Figure 1 is a rear perspective view of the machine. Fig. 2 is a bottom plan view showing the gearings which drive the rotary chopper. Fig. 3 is a cross-section through the clamping-plates which hold the chopping-blades. Fig. 4 is an inside face view of one of said plates. Fig. 5 is a detail in section, with parts in elevation, showing the clutch for starting and stopping the rotary chopper. Fig. 6 is a detail in section on the line 6 6 of Fig. 2, showing the rods for preventing lateral play or swing of the cultivator-beams.

Referring specifically to the drawings, 6 indicates a platform mounted upon a frame 7, carried on wheels 8. The seat for the operator is indicated at 9. The rear part of the frame or platform is open and the rotating chopper works in said open part. Said chopper comprises a series of blades 10, carried at the outer ends of screw-stems 11, the inner ends of which screw into threaded holes in a rib 12, produced on the inner side or face of a clamping-disk 13. This rib may be provided with any number of holes desired to accordingly carry any desired number of blades. The rods can be screwed in or out, and thereby adjusted to the desired depth or distance of cut. The disk 13 matches with another disk 14, and said disks are held together by bolts and thumb-nuts, (indicated at 15.) When the thumb-nuts are tightened, the stems 11 are clamped between the rims of the disks, said disks being slightly dished to allow the rims to come in binding contact against the stems. By this construction the blades are firmly held and prevented from turning or getting out of position. Said disks carrying the choppers are mounted upon the rear end of a shaft 16, which is carried in a bearing-sleeve 17, hung by a hinged or swinging hanger 18 from a cross-bar 19 of the frame. A tongue-and-grooved clutch, as at 20, is formed between the front end of the shaft 16 and the rear end of a shaft 21, which carries a bevel-pinion 22, meshing with a bevel-gear 23 on the main axle 24 of the machine. The swinging hanger 18 is connected by a rod 25 to a foot-lever 26 at the front end of the platform. The shafts are thrown in or out of clutch to start and stop the rotation of the chopper by moving the foot-lever and swinging the hanger 18 accordingly. When the hanger is swung back, the clutch is disengaged. When it is swung forward, the clutch is engaged and the chopper rotated. The chopper is thus at all times under the control of the operator, who can start and stop it by a single movement of the foot, according to the condition of the plants being worked.

The cultivator comprises two shovels 27, carried by curved beams 28, hung from a cross-bar 29 near the rear of the frame. Said beams are adjustably spaced apart by bars 30, which are slotted and lapped and held at adjustment by a thumb-screw 31. Lateral swing or sway is prevented by depending rods 32, projecting from slotted plates 33, which are fastened to the inner side of the rear bar of the frame by bolts with thumb-screws 34. The bolts extend through the slots, and the depending rods may be adjusted laterally, according to the spread of the cultivator-beams. Said beams are carried in a swinging hanger 35, which is supported on the rear bar of the frame and may be rocked by a hand-lever 37, connected to crank 38 on the end of the rod of which the hanger is formed. Manipulation of the lever swings the hanger in an obvious manner and raises or lowers the cultivator-beams.

It may be said that the bolts 39, by which the beams 28 are connected to the cross-bar 29, will turn so that the cultivator-beams can be spread or swung either to right or left, as desired.

In the embodiment of the invention shown there is an absence of many and complicated parts, the machine being one which may be readily constructed and at a low cost.

What I claim as new, and desire to secure by Letters Patent, is—

1. In a rotary cotton-chopper, a swinging hanger, a chopper-shaft carried thereby and which swings lengthwise therewith, and having a clutch part at one end, a drive-shaft having the other clutch part, and means to swing the hanger to engage or disengage the clutch.

2. In a cotton-chopper, in combination, a wheeled frame, a drive-shaft carried thereon, means to transmit motion to the shaft from the wheels, a lengthwise-swinging driven shaft in longitudinal alinement with said drive-shaft, said shafts having a clutch at their meeting ends, chopping-blades carried by said driven shaft, a swinging hanger connected to the frame and carrying said driven shaft, and means to swing the hanger, to engage or disengage the clutch.

In testimony whereof I have signed my name to this specification in the presence of two subscribing witnesses.

GEORGE ZOLL.

Witnesses:
ADOLF ZOLL,
F. J. RIWETZ.